(12) United States Patent
Cogan

(10) Patent No.: US 12,001,776 B2
(45) Date of Patent: Jun. 4, 2024

(54) SYSTEMS AND METHODS FOR AUTOMATICALLY REFORMATTING PUBLICATIONS

(71) Applicant: PTI Marketing Technologies Inc., Solana Beach, CA (US)

(72) Inventor: Douglas Neal Cogan, Brookfield, IL (US)

(73) Assignee: PTI Marketing Technologies Inc., Solana Beach, CA (US)

( * ) Notice: Subject to any disclaimer, the term of this patent is extended or adjusted under 35 U.S.C. 154(b) by 0 days.

(21) Appl. No.: 15/703,635

(22) Filed: Sep. 13, 2017

(65) Prior Publication Data

US 2018/0074999 A1 Mar. 15, 2018

Related U.S. Application Data

(60) Provisional application No. 62/394,216, filed on Sep. 14, 2016.

(51) Int. Cl.
*G06F 40/106* (2020.01)
*G06F 3/147* (2006.01)
(Continued)

(52) U.S. Cl.
CPC ............ *G06F 40/106* (2020.01); *G06F 3/147* (2013.01); *G06F 40/103* (2020.01);
(Continued)

(58) Field of Classification Search
CPC . G06F 16/20; G06F 16/30; G06F 3/04; G06F 40/00; G06F 16/90; G06F 40/106;
(Continued)

(56) References Cited

U.S. PATENT DOCUMENTS 6,879,943 B1 4/2005 Shigemori
7,123,274 B2 10/2006 Komagamine et al.
(Continued)

FOREIGN PATENT DOCUMENTS

JP 2000-200270 7/2000
JP 2004-096560 3/2004
(Continued)

OTHER PUBLICATIONS

International Search Report and Written Opinion for International Application No. PCT/US2017/051328, dated Dec. 5, 2017, 10 pages.
(Continued)

*Primary Examiner* — Sanchita Roy
(74) *Attorney, Agent, or Firm* — Cooley LLP

(57) ABSTRACT

Systems and methods for providing resized layouts accommodating a plurality of documents sizes for variable data printing are disclosed. A computerized system is used to lay out a template for a given document having a first page size and including variable elements based on user input. The user can define the frame of each element according to one or more parameters including a scaling ratio, an X and Y alignment, and a must fit portion of the frame. The user provides a second page size which includes at least one dimension different than the first page size. A new document is automatically prepared that includes the content of the original document that is resized according to the one or more parameters.

53 Claims, 10 Drawing Sheets

(51) Int. Cl.
  *G06F 40/103* (2020.01)
  *G06F 40/114* (2020.01)
  *G06F 40/143* (2020.01)
  *G06F 40/174* (2020.01)
  *G06F 40/183* (2020.01)
  *G06F 40/186* (2020.01)
  *G06K 15/02* (2006.01)

(52) U.S. Cl.
  CPC .......... *G06F 40/114* (2020.01); *G06F 40/143* (2020.01); *G06F 40/174* (2020.01); *G06F 40/183* (2020.01); *G06F 40/186* (2020.01); *G06K 15/02* (2013.01); *G06K 15/1836* (2013.01)

(58) Field of Classification Search
  CPC ...... G06F 3/147; G06F 40/103; G06F 40/114; G06F 40/143; G06F 40/174; G06F 40/183; G06F 40/186; G06K 15/02; G06K 15/1836
  See application file for complete search history.

(56) References Cited

U.S. PATENT DOCUMENTS

| | | | |
|---|---|---|---|
| 7,757,167 B2 | 7/2010 | Kobashi et al. | |
| 2002/0135800 A1* | 9/2002 | Dutta | G06F 3/1219 358/1.15 |
| 2003/0103124 A1 | 6/2003 | Silverbrook | |
| 2004/0165217 A1 | 8/2004 | Vial et al. | |
| 2005/0039120 A1 | 2/2005 | Komagamine et al. | |
| 2005/0094206 A1* | 5/2005 | Tonisson | G06F 40/103 358/1.18 |
| 2005/0179947 A1 | 8/2005 | Kobashi et al. | |
| 2006/0103667 A1* | 5/2006 | Amit | G06F 40/103 715/788 |
| 2006/0259859 A1* | 11/2006 | Ivarsoy | G06F 16/9577 715/255 |
| 2007/0079236 A1* | 4/2007 | Schrier | G06F 40/114 715/209 |
| 2007/0127073 A1 | 6/2007 | Goel et al. | |
| 2007/0192686 A1* | 8/2007 | Fortes | G06F 17/211 715/244 |
| 2010/0115400 A1* | 5/2010 | Yamanakajima | G06F 40/186 715/243 |
| 2011/0026042 A1 | 2/2011 | Cogan et al. | |
| 2013/0007592 A1* | 1/2013 | Dougherty | G06T 11/60 715/234 |
| 2014/0022585 A1 | 1/2014 | Cogan | |
| 2016/0132992 A1* | 5/2016 | Rodrig | G06F 3/017 715/746 |

FOREIGN PATENT DOCUMENTS

| | | |
|---|---|---|
| JP | 2005-216179 | 8/2005 |
| JP | 2007-509385 | 4/2007 |
| WO | WO 2005/033969 | 4/2005 |

OTHER PUBLICATIONS

Extended European Search Report for European Application No. 17851443.6, dated Apr. 20, 2020, 7 pages.

* cited by examiner

SYSTEMS AND METHODS FOR AUTOMATICALLY REFORMATTING PUBLICATIONS

CROSS-REFERENCE TO RELATED APPLICATIONS

This application also claims priority to and the benefit of U.S. Provisional Patent Application Ser. No. 62/394,216, filed Sep. 14, 2016, entitled "Systems and Methods for Automatically Reformatting Publications," the disclosure of which is hereby incorporated by reference in its entirety, the content of which is hereby incorporated by reference herein in its entirety for all purposes.

This application is related to U.S. patent application Ser. No. 11/200,861, entitled SYSTEM & METHOD FOR DISTRIBUTED DESIGN OF A VARIABLE DATA PUBLICATION, filed on Aug. 10, 2005, the content of which is hereby incorporated by reference herein in its entirety for all purposes. This application is also related to U.S. patent application Ser. No. 12/534,717, entitled APPARATUS & METHODS FOR IMAGE PROCESSING OPTIMIZATION FOR VARIABLE DATA PRINTING, filed on Aug. 3, 2009, the content of which is hereby incorporated by reference herein in its entirety for all purposes.

FIELD OF THE INVENTION

The present disclosure relates to methods and systems for variable-data publishing, more particularly, variable-data publishing in multiple output sizes.

BACKGROUND

As printing technologies migrate from traditional printing methods such as lithography to digital printing, use of digital printers and associated processing of printed images and page layouts in digital printing systems has dramatically increased. While traditional printing methods may still be more cost effective for large quantities of standardized print on a single page size, the cost of digital printing systems and associated media has continued to decrease, making digital printing more affordable. In addition, digital printing technology can often facilitate customized printing in a more cost-effective way that traditional high volume printing methods.

For example, one type of customized printing is known as variable-data printing (VDP) (also known as variable-information printing or VIP or VI or variable-data publishing). VDP is a form of on-demand printing in which elements such as text, graphics and images may be changed from one printed piece to the next, without stopping or slowing down the printing process and without using information from a database or external file. For example, a set of personalized letters, each with the same basic layout, can be printed with a different name and address on each letter, while retaining other common elements, such as images, text, associated drop shadows, or other common elements. Variable data printing is typically used for direct marketing, customer relationship management, advertising and invoicing on self-mailers, brochures, or postcard campaigns, but may also be used for a range of other printing applications where customization is required. An article describing VDP entitled "Speaking in Tongues: Sorting Out Variable Data Printing Languages by Eliot Harper, incorporated by reference herein, is available at http://www.fujixerox.com.au/products/image/media/TSR-0906-Speak-Tongues-reprint.pdf VDP printing may be implemented using a language such as Personalized Print Markup Language or PPML, which is described in an article entitled "Introduction to the Personalized Print Markup Language: The PPML Family of XML Standards, available at ppml.podi.org/component/option,com_docman/Itemid,0/task,doc_download/gid, 13&Itemid=/ which explains how PPML can be used to implement VDP by caching images and reusing them.

VDP is a direct outgrowth of digital printing technology, which harnesses computer systems, digital printing devices, and specialized software to create high-quality black and white or full color documents with a look and feel comparable to conventional offset printing. VDP enables the mass customization of documents via digital print technology, as opposed to the mass-production of a single document using offset lithography. For example, instead of producing 10,000 copies of a single document to deliver a single message to 10,000 customers, variable data printing provides for printing 10,000 unique documents with customized messages for each customer.

VDP traditionally involves replacing one element for another element, both elements having the same size or fitting into the same portion of a template. For example, a name and address may be replaced with another name and address in a promotional letter template. Both names and addresses occupy the same portion of the template and the other portions of the template, such as a background, can remain unchanged from one document to the next. With traditional VDP, if the output document size changes, a new template must be manually created to conform to the new document size. Manually creating new templates to conform to new output documents sizes can be expensive and impractical due to the time required to resize each frame for each element within the template.

SUMMARY

The present disclosure relates to systems and methods for providing reformatted layouts accommodating a plurality of documents sizes for use with variable data printing. In one aspect, the present disclosure relates to a system for automatically formatting a page having a first page size to a second page size. The system includes a composition subsystem configured for providing a template having a template length and a template width. The template includes an element and the element includes a frame having a first length and a first width. The frame is positioned at a first position within the template. The composition subsystem is also configured for positioning the frame at a second position within the template. The second position is determined in relation to the template length and the template width. The composition subsystem is also configured for encoding a first parameter of the element. The first parameter determines a property of the element within the template. The system further includes a printing subsystem configured for rendering an output. The output includes the page having a page length and a page width corresponding to the second page size. At least one of the page length and the page width is different than the template length and template width.

In one aspect, the system includes a first parameter that can be encoded in relation to the template. The first parameter can be encoded in relation to the template length and template width. The first parameter can also be encoded independent of the template length and template width. The first parameter can be a disposable portion parameter of the element. The first parameter can also be an alignment parameter of the element. The first parameter can also be a scaling ratio parameter of the element. The first parameter can be specified in relation to another element within the template. The first parameter can be a fixed edge parameter. The first parameter can be a content parameter. The first parameter can be specified in relation to a change of one dimension between the template and the page. The first parameter can be specified in relation to a relative area size change between the original template and the new page. The first parameter can be a deletion parameter.

In one aspect, the composition subsystem of the system is further configured for receiving the page length and the page width. The page length and the page width correspond to the second page size. The composition subsystem can be further configured for generating a print file. The print file includes the page formatted at the second page size. The print file can also include one or more pre-rasterized objects and be in the form of a Java, C, C#, C++, scripting languages, PostScript, PPML, or an XML, file.

In one aspect, the system also includes a raster image processor, the raster image processor is configured for rasterizing the one or more pre-rasterized objects. In the system, rendering the printed output includes rendering the printed output on paper or other printable media using thermal toner or ink.

In one aspect, the present disclosure relates to a system for automatically reformatting a page layout to a new page size. The system includes a composition subsystem, a raster image processor; and a printing subsystem. The composition subsystem is configured for preparing a first page having a first length and a first width and comprising a first layout including an element having a position within the layout. The composition subsystem is also configured for receiving information specifying a disposable portion parameter of the element, receiving information specifying an alignment parameter of the element, receiving information specifying a scaling ratio parameter of the element, receiving a second length and a second width corresponding to a second page size, and reformatting the first layout to a second layout. The second layout is configured to fit the second page size. The element is adjusted based on one or more of the disposable portion parameter, the alignment parameter and the scaling ratio parameter.

In one aspect, the composition subsystem of the system is configured for generating a print file containing the second layout. The print file can be in the form of a Java, C, C#, C++, scripting languages, PostScript, PPML, or XML file. The print file can contain one or more pre-rasterized objects.

The raster image processor of the system can be configured for rasterizing the one or more pre-rasterized objects. The printing subsystem can be configured for rendering a printed output. The printed output can comprise a document of the second page size displaying the second page layout.

In another aspect, the present disclosure relates to a method for automatically formatting a page of a first page size to a second page size. The method includes providing a template having a template length and a template width. The template includes an element. The element includes a frame having a first length and a first width and the element is positioned at a first position within the template. The method includes positioning the element at a second position within the template. The second position can be determined in relation to the template length and the template width. The method includes encoding a first parameter of the element. The first parameter can determine a property of the element within the template. The method also includes rendering an output. The output can include the page having a page length and a page width corresponding to the second page size. At least one of the page length and the page width are different than the template length and template width.

In one aspect, the first parameter of the method is encoded in relation to template. The first parameter can be encoded in relation to the template length and template width. The first parameter can also be encoded independent of the template length and template width. The first parameter can be a disposable portion parameter of the element. The first parameter can be an alignment parameter of the element. The first parameter can be a scaling ratio parameter of the element. The first parameter can be specified in relation to another element within the template. The first parameter can be a fixed edge parameter. The first parameter can be a content parameter. The first parameter can be specified in relation to a change of one dimension between the template and the page. The first parameter can be specified in relation to a relative area size change between the original template and the new page. The first parameter can be a deletion parameter.

In another aspect, the method further includes generating a print file. The print file includes the page formatted at the second size. The print file can also include one or more pre-rasterized objects and is in the form of a Java, C, C#, C++, scripting languages, PostScript, PPML, or an XML file. The method can further include rasterizing the one or more pre-rasterized objects using a raster image processor. Rendering the output can include rendering a printed output using a printing system. Rendering the printed output can also include rendering the printed output on paper or other printable media using thermal toner or ink. Rendering the output can include displaying the page on a display device. The display device can be one or more of a cell phone, a computer display, or a television.

In another aspect, the present disclosure relates to a method for automatically reformatting a page layout to a new page size. The method includes preparing a first page having a first length and a first width and comprising a first layout including an element having a position within the layout. The method also includes receiving information specifying a disposable portion parameter of the element, receiving information specifying an alignment parameter of the element, receiving information specifying a scaling ratio parameter of the element, receiving a second length and a second width corresponding to a second page size; and reformatting the first layout to a second layout. The second layout is configured to fit the second page size. The element is adjusted based on one or more of the disposable portion parameter, the alignment parameter and the scaling ratio parameter.

In another aspect, the method further includes generating a print file containing the second layout. The print file can be in the form of a Java, C, C#, C++, scripting languages, PostScript, PPML, or XML file. The print file can contain one or more pre-rasterized objects. The method further includes rasterizing the one or more pre-rasterized objects using a raster image processor, and rendering an printed output using a printer. The printed output comprises a document of the second page size displaying the second page layout.

In another aspect, the present disclosure relates to a non-transitory processor-readable medium containing processor executable instructions for automatically formatting a page of a first page size to a second page size. The non-transitory processor-readable medium contains processor executable instructions for providing a template having a template length and a template width. The template includes an element. The element includes a frame having a first length and a first width and is positioned at a first position within the template. The non-transitory processor-readable medium also contains processor executable instructions for positioning the element at a second position within the template. The second position is determined in relation to the template length and the template width. The non-transitory processor-readable medium also contains processor executable instructions for encoding a first parameter of the element. The first parameter determines a property of the element within the template. The non-transitory processor-readable medium also contains processor executable instructions for generating a print file, the print file including the page having a page length and a page width corresponding to the second page size, at least one of the page length and the page width being different than the template length and template width.

In one aspect, the first parameter of the non-transitory processor-readable medium is encoded in relation to template. The first parameter can be encoded in relation to the template length and template width. The first parameter can also be encoded independent of the template length and template width. The first parameter can be a disposable portion parameter of the element. The first parameter can be an alignment parameter of the element. The first parameter can be a scaling ratio parameter of the element. The first parameter can be specified in relation to another element within the template. The first parameter can be a fixed edge parameter. The first parameter can be a content parameter. The first parameter can be specified in relation to a change of one dimension between the template and the page. The first parameter can be specified in relation to a relative area size change between the original template and the new page. The first parameter can be a deletion parameter.

In one aspect, the print file of the non-transitory processor-readable medium includes one or more pre-rasterized objects and is in the form of a Java, C, C#, C++, scripting languages, PostScript, PPML, or an XML file. The print file can include the page formatted at the second size.

In one aspect, the non-transitory processor-readable medium also contains processor executable instructions for preparing a first page having a first length and a first width and comprises a first layout including an element having a position within the layout. The non-transitory processor-readable medium also contains processor executable instructions for receiving information specifying a disposable portion parameter of the element, receiving information specifying an alignment parameter of the element, receiving information specifying a scaling ratio parameter of the element, receiving a second length and a second width corresponding to a second page size; and reformatting the first layout to a second layout. The second layout is configured to fit the second page size. The element is adjusted based on one or more of the disposable portion parameter, the alignment parameter and the scaling ratio parameter. The non-transitory processor-readable medium further contain processor executable instructions for generating a print file containing the second layout. The print file can be in the form of a Java, C, C#, C++, scripting languages, PostScript, PPML, or XML file. The print file can contain one or more pre-rasterized objects.

Additional aspects of the present disclosure are further described below in conjunction with the FIGS. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The following U.S. published applications are hereby incorporated herein by reference in their entireties for all purposes:
  Title: CENTRALIZED SYSTEM AND METHOD FOR MANAGING ENTERPRISE OPERATIONS; Application No. PCT/US99/26523; Publication No. WO 2000/030000; Application Date Nov. 9, 1999;
  Title: SYSTEM AND METHOD FOR CREATING, GENERATING AND PROCESSING USER-DEFINED GENERIC SPECS; application Ser. No. 09/780,099; Publication No. US 2002-0032694 A1; Application Date Feb. 9, 2001;
  Title: SYSTEMS & METHODS FOR PROVIDING VARIABLE DATA PRINTING (VDP) USING DYNAMIC FONT DOWNGRADING; Application Ser. No. 12/571,387; Publication No. US-2011-0075196-A1; Application Date Sep. 30, 2009;
  Title: SYSTEMS & METHODS FOR PROVIDING VARIABLE DATA PRINTING (VDP) USING DYNAMIC FONT DOWNGRADING; Application No. PCT/US2010/050302; Publication No. WO 2011/041241; Application Date Sep. 24, 2010;
  Title: SYSTEMS & METHODS FOR PROVIDING VARIABLE DATA PRINTING (VDP) USING DYNAMIC FONT DOWNGRADING; application Ser. No. 14/269,802; Publication No. US-2014/0240731-A1; Application Date May 5, 2014;
  Title: APPARATUS & METHODS FOR IMAGE PROCESSING OPTIMIZATION FOR VARIABLE DATA PRINTING; application Ser. No. 12/534,717; Publication No. US-2011/0026042-A1; Application Date Aug. 3, 2009;
  Title: APPARATUS AND METHODS FOR IMAGE PROCESSING OPTIMIZATION FOR VARIABLE DATA PRINTING (VDP); Application No. PCT/US2010/044298; Publication No. WO2011/017361; Application Date Aug. 3, 2010;
  Title: APPARATUS & METHODS FOR IMAGE PROCESSING OPTIMIZATION FOR VARIABLE DATA PRINTING; application Ser. No. 14/105,955; Publication No. US-2014-0104650-A1; Application Date Dec. 13, 2013;
  Title: SYSTEM AND METHOD FOR PRINTABLE DOCUMENT JOB SUBMISSION; application Ser. No. 13/554,344; Publication No. US-2014-0022585-A1; Application Date Jul. 20, 2012;
  Title: SYSTEM AND METHOD FOR PRINTABLE DOCUMENT JOB SUBMISSION; Application No. PCT/US2013/051265; Publication No. WO 2014/015249; Application Date Jul. 19, 2013;
  Title: SYSTEM AND METHOD FOR PRINTABLE DOCUMENT VIEWER OPTIMIZATION; application Ser. No. 13/827,173; Publication No. US-2014-0281940-A1; Application Date Mar. 14, 2013; and
  Title: SYSTEM AND METHOD FOR PRINTABLE DOCUMENT VIEWER OPTIMIZATION; Application No. PCT/US2014/025814; Publication No. WO 2014/160100; Application Date Mar. 13, 2014.

BRIEF DESCRIPTION OF THE DRAWINGS

The present disclosure is more fully appreciated in connection with the following Detailed Description taken in conjunction with the accompanying drawings. The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1:
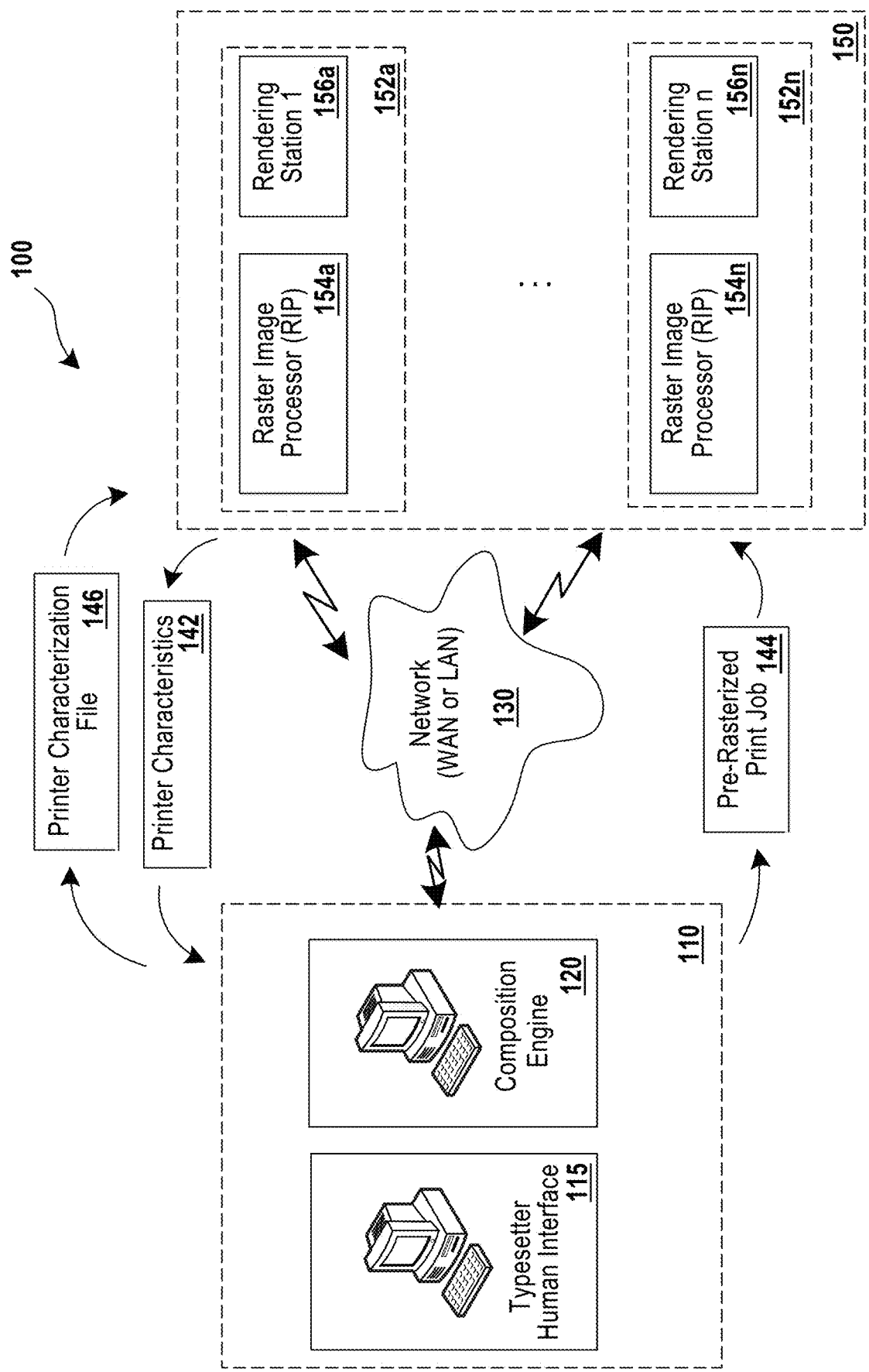
FIG. 1 is an illustration of a typical printing system, including a composition subsystem and a printing subsystem, on which embodiments of the present disclosure may be implemented.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

Following below are more detailed descriptions of various concepts related to, and embodiments of, inventive systems and methods for automatically reformatting publications to accommodate a variety of page sizes. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. Though described herein with in connection with VDP, the concepts and embodiments are also applicable to publishing using non-variable data for a variety of different page sizes.

Programs, like FusionPro available from PTI Marketing Technologies, Inc., allow a user to create a document by laying out elements including a frame and content on a page. The frames correspond to the positions of the various elements on the page. The elements can be graphics, text, or combinations thereof. The elements may be stored in databases and can be variable or non-variable data. After the user has laid out the frames for optimal viewing on a given page size, the user is then able to published the page into a finished document. In one embodiment, a user creates an advertisement by positioning multiple frames on a page, and then publishing to create the advertisement.

After laying out the initial page, the user may save the layout as a template. The template contains information relating to the size and position for each frame on the page. The template is optimized by the user to display the most important parts of each element for a given page size. To accommodate publishing the document in other page sizes, the user can execute a rule after providing additional information on the treatment of the frames. This additional information allows the template to automatically format the document for different page sizes.

In order to further describe details of various embodiments of the present disclosure, attention is now directed to FIG. 1 which illustrates a typical digital printing system 100 on which various embodiments of the present disclosure may be implemented. Printing system 100 includes two primary sub-sections—a composition or typesetting subsystem or subsection (also denoted herein as composition system or typesetter) 110 and a printing subsection (also denoted herein as a printing subsystem) 150. These subsections may be interconnected via a network 130 as shown in FIG. 1, such as a local area network (wired LAN, such as an Ethernet or other LAN), a wireless network, a wide area network (WAN), such as the Internet, a corporate network, or via other networking configurations. In some embodiments, subsections 110 and 150 need not be directly interconnected as shown in FIG. 1, but data and information may be transferred manually between them, such as by human users or operators. Data and information transferred between subsystems 110 and 150 may include a set of printer characteristics 142, a print job 144, a printer characteristics determination file 146, as well as other data or information (not shown).

Composition subsection 110 may include two computer sub-systems 115 and 120. Sub-system 115 is denoted herein as a typesetter human interface and is typically a computer system containing hardware and software configured to receive printer characteristics 142, which include information associated with the characteristics of a particular printer system (or systems) 152, store that information in a memory, and provide connectivity facilitating access to that information to sub-system 120 or transfer the received information to sub-system 120. Sub-system 115 may also be configured to communicate directly with printing subsection 150 to generate a printer characteristics determination file 146 to query for printer characteristics 142 of one or more printers 152a-152n, and/or other information, and receive printer characteristics 142 from the printing subsection 150.

Sub-system 120 is denoted herein as a composition engine or typesetter system, and it is configured with hardware and software to allow a user to compose a print job using a printing composition or typesetting tool such as Fusion Pro or another similar or equivalent tool. In some embodiments, the components and functionality associated with typesetter human interface 115 (also denoted herein as "interface" 115 for brevity) and composition engine 120 may be combined in a single computer system rather than in the form of separate sub-systems as shown in FIG. 1. In this case, the combined system may be referred to herein merely as a typesetter or typesetter system 110.

In addition to supporting functionality associated with composition of print jobs as may be provided by an application such as Fusion Pro, composition engine 120 may also be configured to execute additional functions as may be implemented in one or more functional modules, as further described herein, to receive printer characteristics and generate one or more pre-rasterized print jobs 144 for execution on one or more printers 152a-152n of printing system 150.

As used herein, a pre-rasterized print job describes a print job, typically in the form of a printer programming language such as PostScript, that includes instructions for generating the printed output along with one or more pre-rasterized objects (such as images, fonts, drop-shadows, other vector objects, etc.). Embodiments of this functionality and associated implementation details for embodiments are further described below.

Printing system, or printing subsystem, 150 includes one or more printers 152a-152n and may also include other hardware or software elements (not shown). Each of these printers 152 may further be divided into a raster image processor module ("RIP") 154 and a rendering station module 156. RIP 154 is typically a computer system configured to receive a print job and generate the specific page printing bitmap or page dot pattern for rendering (i.e., generating the printed output) on rendering station 156. As is known in the art, each printer has a native output resolution or resolutions at which the printed output is generated. The printed output consists of printed dots or other very small printed features, with the dots placed on the page by a print rendering apparatus of the rendering station 156. For example, the dots may consist of inks, toners, or other print media placed on the printed page by ink jets or thermal mechanisms, at the printer's native resolution. The native resolution defines the particular dot pattern of the printed output that can be produced on the particular printer's rendering station. In effect, any raster objects of an incoming print job are converted by the RIP into a page layout in the printer's native resolution, irrespective of the specific original resolution of the object. This requires that objects such as images be converted from their initial resolution to the printer's native resolution.

In addition, the rotation of the object on the page may vary based on the particular printer's page layout, how the printed pages are configured on the printed sheet (for example, some printed pages may be oriented horizontally on the page, whereas other pages having the same content and objects may be rotated 90 degrees or 180 degrees to maximize printable area of the output), and/or based on variable rotation of printed objects, beyond just fixed +/−90 or 180 degree rotations.

When a print job is provided to the printer, such as printers 152a-152n of FIG. 1, the RIP 154 receives the print job, typically in the form of a printer programming language file such as Adobe PostScript, and generates all or part of the printed page in the native printer resolution and rotation. As noted above, this processing may include converting an object from the print job from one resolution to another, generating a raster object in the printer's native format from a vector object such as a font, drop shadow, etc., rotating objects based on the desired print orientation or rotation, and/or other processing such as is further described and illustrated herein.

To further elaborate on details of processing as may be performed by the RIP 154, a RIP is a component of a printing system that generates a rasterized page layout for printing based on an input print job. The page layout is then sent to a print rendering device, such as rendering station 156 as shown in FIG. 1, for generation of the printed output. The print job input is typically in the form of a page description in a high-level page description language such as PostScript, Portable Document Format, XPS, and the like. These print jobs include a set of programming instructions that describe how to generate the particular print job as well as specific objects (components) of the print job, such as images, fonts, drop shadows, vector elements, etc. that may be needed to produce the printed output. The RIP performs data processing to convert a print job file (such as, in an exemplary embodiment, a PostScript file) from the programming language description of the printed page to a dot pattern page layout for rendering the page in the native output resolution and rotation.

A RIP can be implemented as a software component executing on a computer system, such as RIP 156 of FIG. 1, or as a firmware or software program executed on a microprocessor, DSP, ASIC or other hardware inside a printer. RIP software may be optimized for VDP or may not be VDP-aware, depending on the type of print tasks at hand. Both types of RIP technology are widely available from software vendors such as EFI and Harlequin, and from printer vendors such as Hewlett-Packard, Nexpress/Kodak and Xerox. For high-end and intermediate digital typesetting standalone hardware RIPs are typically used. PostScript printers contains an associated PostScript RIP either in hardware/software elements or in firmware. One advantage of the present disclosure is that it operates on RIPs that are not VDP-aware such as office printer equipment made by companies such as Ricoh and Canon.

As noted above, a RIP is required to generate raster elements of printed pages as well as to convert raster objects provided at a particular resolution and rotation into the printer's native resolution and rotation. Various techniques for performing these transformations are known in the art, however, this processing can become very computationally intensive as well as time consuming when done at the RIP. Consequently, if the processing requirements are sufficiently large, the RIP may not be able to keep up with the output speed of the rendering station of the printer system, which can slow down the printing output and affect overall printing efficiency.

For example, in the system of FIG. 1, if a print job generated at composition engine 120 includes a number of image objects in a raster format (such as, for example, JPG, TIFF, etc.) at a high resolution and specific rotation and the final printed output size and associated native resolution of the rendering station requires a different resolution and/or rotation, the RIP 154 must convert the images to the new resolutions and/or rotations. If the RIP 154 cannot perform this processing fast enough, the rendering station 156 must pause or slow down the output, reducing overall printing throughput.

In order to address this problem as well as provide other potential advantages, various embodiments of the present disclosure facilitate offloading of the processing required by the RIP 154 to the composition system 120 so as to improve overall printer system throughput.

Figure 2:
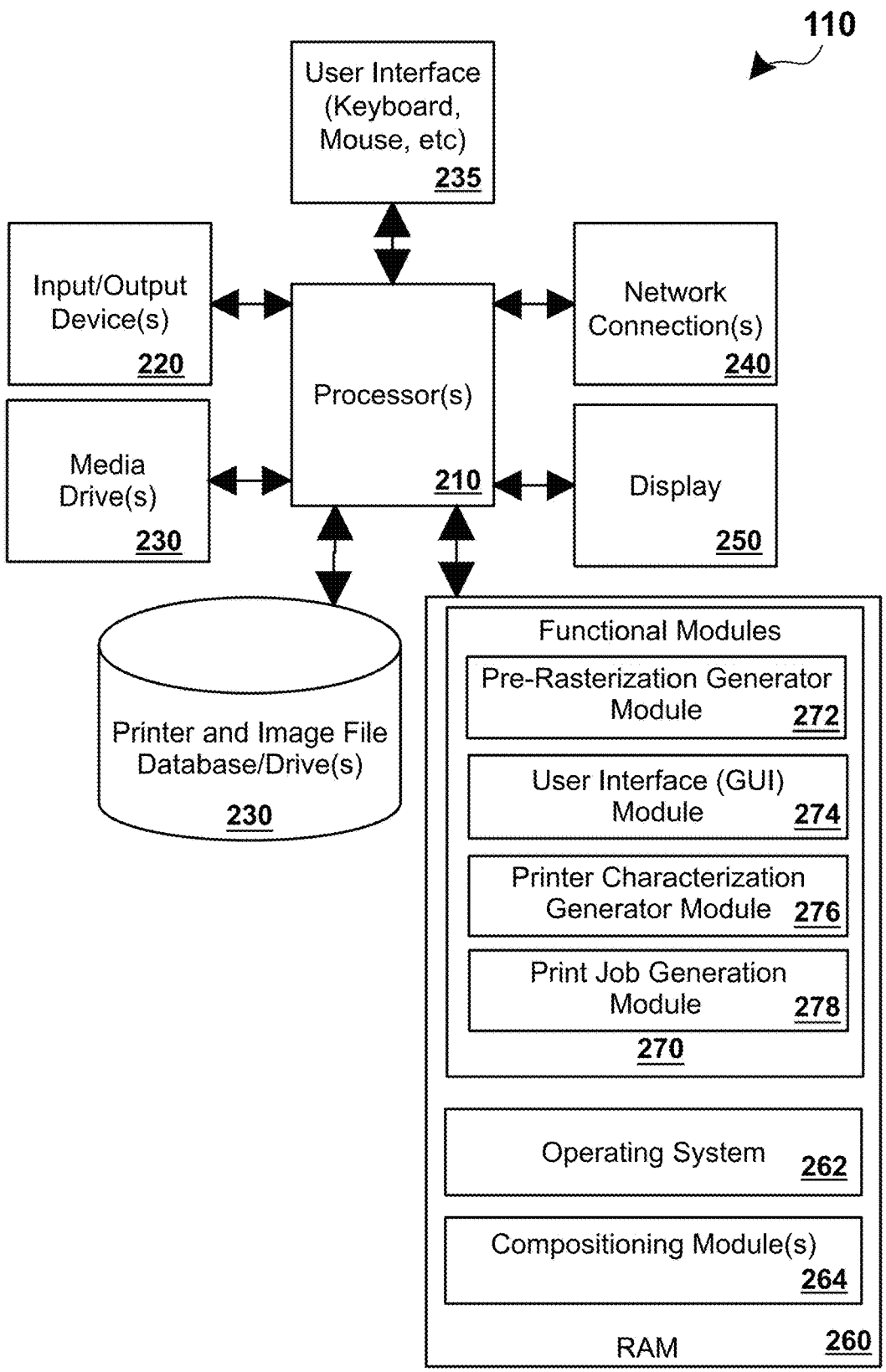
FIG. 2 is an illustration of an embodiment of a Composition/Typesetter System in accordance with aspects of the present disclosure.

Attention is now directed to FIG. 2, which illustrates a typical system configuration for a composition system or typesetting system, such as typesetter 110 as shown in FIG. 1. For purposes of brevity, the various components of FIG. 2 are shown in a simplified form, with some elements removed for purposes of clarity. For example, FIG. 2 illustrates components of a single computer system, however, two separate systems 115 and 120 may also be used as shown in FIG. 1, and/or other configurations may also be used.

Composition system 110 includes one or more processors 210, one or more memories or other program and data storage elements 260, and an image/content database 230, which may be part of memory 260. Memory 260 further includes functional modules for providing the various functionality as is described herein. These functional modules may include hardware elements, software elements, firmware elements, and/or combinations of these elements to implement various functionality. In particular, the functional modules may include a Pre-Rasterization Generator Module 272, a User Interface Module 272, a Printer Characterization Module 276, a Print Job Generator Module 278, and/or combinations of these various modules as well as other modules. In addition, memory 260 may include one or more operating systems 262 or other applications (not shown), as well as a compositioning module 264, which may be, for example, the Fusion Pro Desktop or another composition or typesetting application program. The functionality provided by the functional modules 270 may be incorporated into the compositioning module 264, such as via direct integration or via plug-ins or other incorporation mechanisms. In addition, compositioning module 264 may be a standalone application or may be integrated into another application, such as in the form of a plug-in or via other program integration mechanisms.

Composition system 110 may also include other elements such as one or more media drives 230 (removable hard disk drives, CD, DVD, BD drives, Flash memory drives, USB drives, and the like) to facilitate input, output and storage of print jobs, printer characterization data, image files and/or other data or information. In addition, composition system 110 may include one or more I/O devices 220, such as USB, SCSI, Ethernet, or Firewire interfaces, one or more user interfaces and associated hardware and/or software, such as keyboards, computer mice, trackballs, and the like, one or more network connections 240, such as wired or wireless network connections (Ethernet, Wi-Fi, etc.) to facilitate connectivity to other systems, such as printing subsystem 150. A display 250, such as a CRT monitor, LCD monitor, or other visual output device may also be included to facilitate data and information input and output, user interface functionality, as well as to provide a composition interface and/or a display mechanism for viewing pre-rasterized page layouts or pre-rasterized objects in the printer's native resolution.

Figure 3:
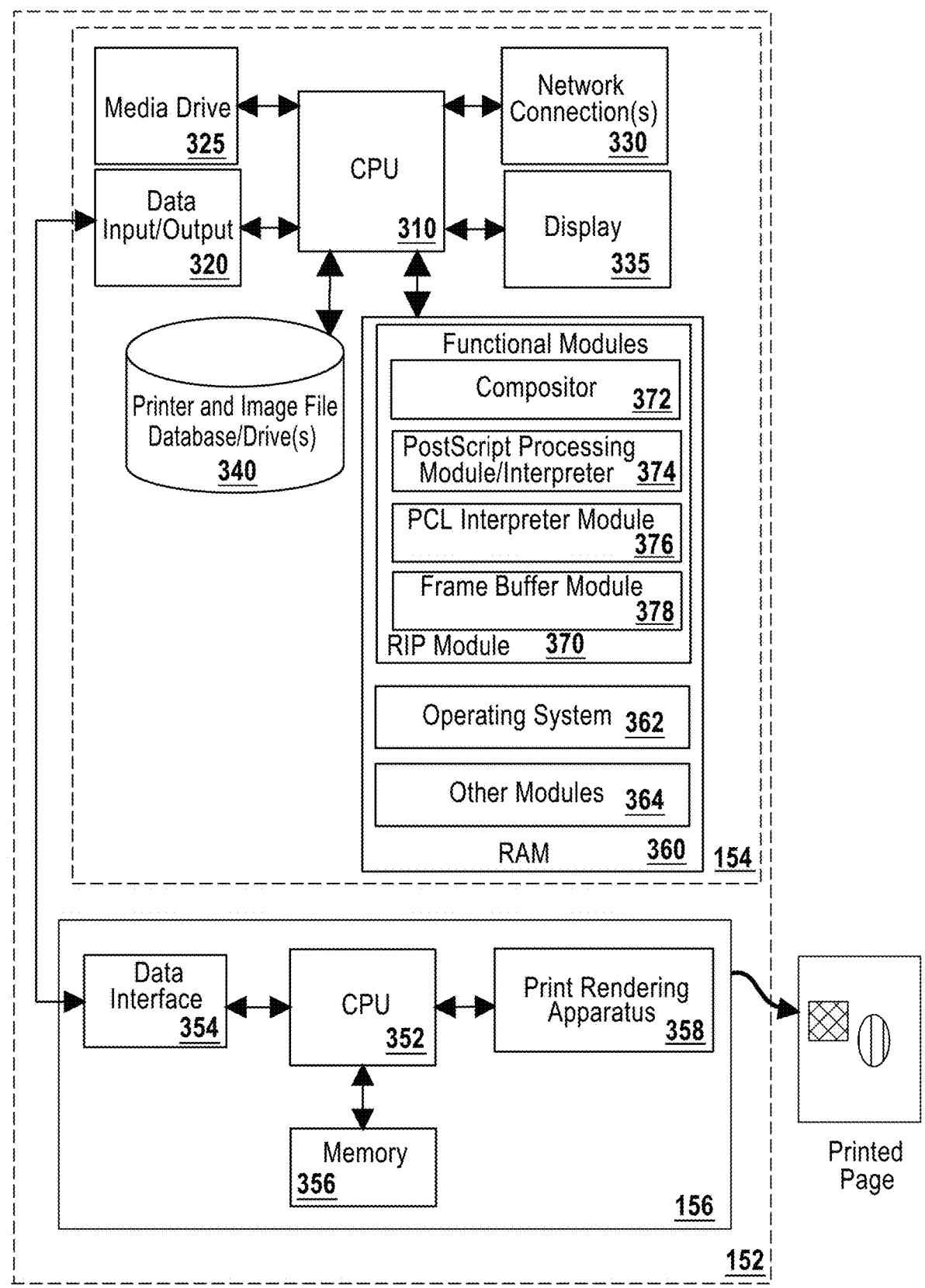
FIG. 3 is an illustration of an embodiment of a Printer System in accordance with aspects of the present disclosure.

Attention is now directed to FIG. 3 which illustrates a typical printer system configuration. Printer system 152 as shown in FIG. 3 may be a single printer or one of a plurality of printers in a printing subsystem 150 as shown in FIG. 1. As described previously, printer system 152 includes a RIP module 154 and a rendering station module 156, and may include other elements (not shown). RIP module 154 may include one or more processors or CPU's 310, one or more data I/O modules 320 configured to interface between RIP 154 and rendering station 156, and a memory 360. Memory 360 further includes functional modules for providing the various functionality as is described herein. These functional modules may include hardware elements, software elements, firmware elements, and/or combinations of these elements to implement various functionality.

In particular, in a typical embodiment, the RIP may be in the form of a RIP software module 370 comprising a set of functional modules that may include a Compositor Module 372, one or more programming job processing modules such as a Postscript Processing Module 374, a PCL Interpreter Module 376 and/or other print job processing modules configured to generate a page layout based on a received print job. In addition, the functional modules may include page or frame buffer modules configured to store native page or frame information for transmission to the rendering station 156.

For example, frame buffer module may include a complete page in a dot pattern form that can be directly converted to printed output by the print rendering apparatus 358. Other functional modules such as operating system module 362 may also be stored in memory 360.

In addition, RIP 154 may include a database 340 that may be integrated with memory 360. Database 340 may be used to store data, information and objects such as are described herein, including pre-rasterized objects and objects provided in the print job to be rasterized by the RIP module 370. The compositor module 372 may be used for taking output from a PostScript interpreter 374 and PCL module 376 and combining them with other page elements in the frame buffer 378 to account for transparency, where supported (frame buffer 378 stores a bitmap of the printed output, and data loaded into the frame buffer as "transparent" will allow other data in the buffer at the same pixel location to show-through). RIP 154 may also include network connection module(s) 330 to facilitate network connectivity such as to typesetter 110 or to other systems or devices, as well as one or more media drives 325 (removable hard disk drives, CD, DVD, BD drives, Flash memory drives, USB drives, and the like) to facilitate input, output and storage of print jobs, storage and output of printer characterization data, image files and/or other data or information.

Rendering station 156 is configured to receive formatted page information, such as a page dot pattern, from RIP 154 and generate the printed output page in the print rendering apparatus 358's native resolution. While rendering stations 156 may have different configuration based on the type of printer system they are incorporated in, they will generally include at least a processor 352 or logic circuit equivalents such as a PLD, ASIC, etc., as well as memory 356 for storage of incoming data, and a print rendering apparatus 358 which generates the printed page output (such as by laser, ink jet, etc.).

Figure 4:
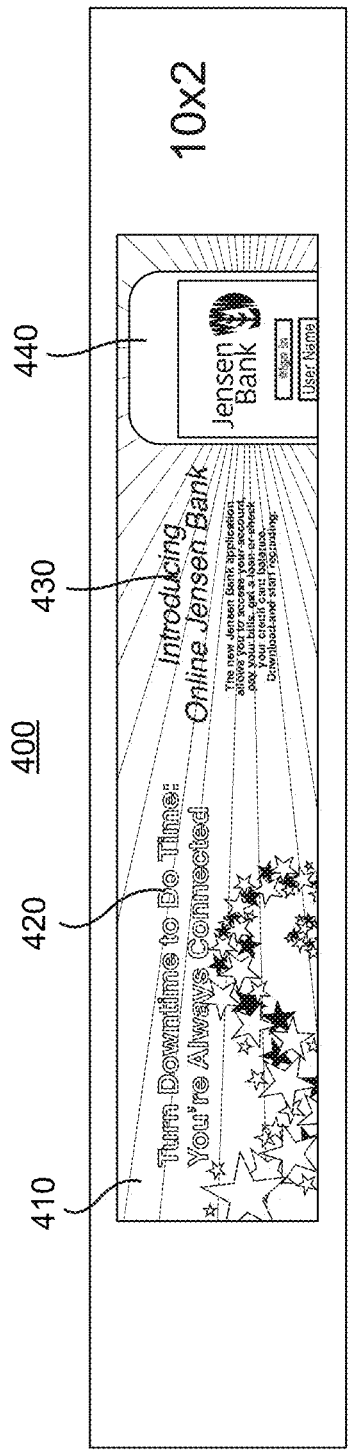
FIG. 4 is an example of an advertisement laid out in an original size, according to an embodiment of the present disclosure.

The following JavaScript code is an example embodiment of rule for setting the values of the parameters to allow for automatically reformatting a publication on a new page size. FIG. 4 shows the original publication and the resulting reformatted published outputs according to the rule are shown in FIGS. 6-10, with the original layout being shown in FIG. 5.

```
var pageWidth = 7200 * StringToNumber(Field("Width"));
var pageHeight = 7200 * StringToNumber(Field("Height"));
var page = GetBodyPage(1);
var originalPageWidth = page.width;
var originalPageHeight = page.height;
page.width = pageWidth;
page.height = pageHeight;
var differenceWidth = pageWidth - originalPageWidth;
var differenceHeight = pageHeight - originalPageHeight;
var differenceRatioWidth = pageWidth / originalPageWidth;
var differenceRatioHeight = pageHeight / originalPageHeight;
var minRatio = 0.8;
var maxRatio = 1.2;
var minWidth = pageWidth * minRatio;
var maxWidth = pageWidth * maxRatio;
var minHeight = pageHeight * minRatio;
var maxHeight = pageHeight * maxRatio;
if (pageWidth < minWidth || pageWidth > maxWidth)
   throw "*** Error: Width must be between " + (minWidth / 7200) +
" and " + (maxWidth / 7200) + "inches.";
if (pageHeight < minHeight || pageHeight > maxHeight)
   throw "*** Error: Width must be between " + (minHeight / 7200) +
" and " + (maxHeight / 7200) + "inches.";
var backgroundFrame = FindGraphicFrame("background");
backgroundFrame.SetGraphic("background.tif"); // background.pdf
backgroundFrame.width = pageWidth;
backgroundFrame.height = pageHeight;
var smallestRatio = Math.min(differenceRatioWidth,
differenceRatioHeight);
SetFrame("headline", "headline" + Field("Headline") +
```

```
".pdf", smallestRatio, "center", "top");
SetFrame("copy", "copy.pdf", differenceRatioWidth, "center",
"center", true);
SetFrame("phone", "phone.pdf", differenceRatioWidth, "center", "center");
```

A rule reads the new page size as can be inputted by the user, read from a list of page sizes, or received from a network storage location. The rule also computes the differences and ratios between the original page size and the new page size, after which, the rule computes whether or not the requested new page size and aspect ratio are within the default 20% range, and reports an error if not. In some examples the default range is 50%, 40%, 30%, 10%, or 5% to 50% including all values and subranges therebetween. The rule reformats the background to the new page size by stretching or shrinking the original background. The rule determines the horizontal and vertical ratios, determines whether the horizontal or vertical ratio is smaller, and stores the smallest ratio.

A rule can automatically resize a frame based on a new page size or a change to an object within a page. A rule can automatically resize a frame independent of a new page size or a change to an object within a page. In order to accomplish automatically resizing or reformatting frames, one or more parameters within the rule is specified.

The SetFrame function includes parameters for each frame that would be resized or repositioned due to a change in page size. The SetFrame function allows the user to predetermine the scaling ratio parameter, which is the amount the frame is to grow or shrink based on its original size. The user also specifies an alignment parameter comprising an X-axis alignment parameter and a Y-axis alignment parameter. The alignment parameter specifies how the frame is to be aligned as it is resized. That is, if the alignment parameter is set to "center", then the center of the resized frame will be in the same relative position as the original page. The user also specifies a disposable portion parameter or a must fit parameter. This parameter specifies that if a frame is resized based on the parameters specified and does not fit in the resized page, then the frame is shrunk further to make sure all the element fits. If the value of disposable portion parameter is not specified or set to false, then some of the element may not be published in the finished document.

Figure 5:
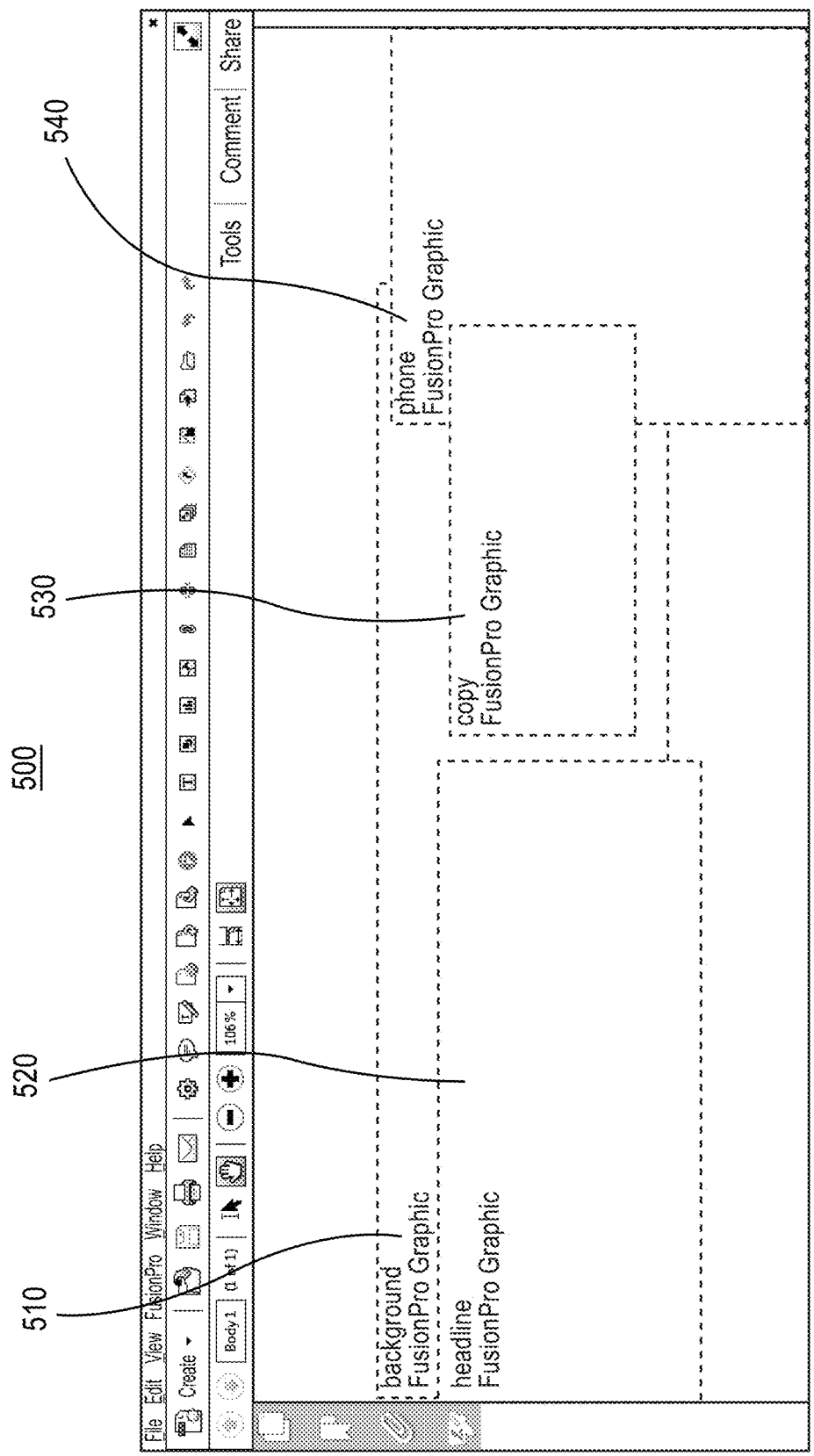
FIG. 5 is an example of a page layout in an original size, according to an embodiment of the present disclosure.

In FIG. 5, two of the frames (Phone 540 and Copy 530) each are resized based on the horizontal ratio (as previously mentioned above) while a third frame (Headline 520) gets the smaller or the horizontal and vertical ratios. The Copy frame 530 is set to require all content be visible because the must fit parameter is set to true, while the other two frames do not require that the entire frame must be published.

In an embodiment, a rule includes a proportional or disproportional resizing parameter. A user can select whether the aspect ratio of a frame can be resized in only a horizontal and/or only vertical direction to accommodate a new page size. In some embodiments, that frame is resized in both the horizontal and vertical directions, but not in a proportional manner, such that the aspect ratio is different for the resized from compared to the original frame.

In an embodiment, a rule includes a frame-to-frame alignment parameter. For example, a frame may be aligned to the top, bottom, middle, left side or right side of another frame, and horizontally, vertically, or diagonally. As the position of a first frame is changed, the position of a second frame is automatically adjusted.

In an embodiment, a rule includes a frame-to-element alignment parameter. For example, a frame may be aligned to the top, bottom, or middle of an object, and horizontally, vertically, or diagonally. As the position of an object is changed, the position of a second frame is automatically adjusted. Objects include, but are not limited to images, fonts, drop-shadows, vector objects, etc.

In an embodiment, a rule includes a content parameter that specifies a size of a frame based on the content of the frame. The content parameter may adjust the size of the frame independent of the page size. For example, in many cases a new page size will cause all other frames to be moved and adjusted in size. The contents of the frames are adjusted as the page is resized. However, some pages may have a frame containing, for example, legal text that is already at a minimum size. This text cannot be removed, partially displayed, or further reduced in font size. Therefore, if the page size is reduced, this frame becomes relatively larger (as a percentage of its size on the page compared the original page size). If, for example, the page size is reduced horizontally to become narrower, the frame containing legal text will become taller to maintain the display of the complete text in the same font size, as the width of the frame is reduced to fit on the new page size. A consequence having a frame with a content parameter is that the rest of the other frames must be resized, not based on the new page size, but based on the area remaining on the page after the frame with the content parameter is resized.

In an embodiment, a rule includes a parameter that specifies a size and/or position of a frame based on the relative change in one dimension between the template to the new page. For example, the size of the frame may be adjusted based on the width or length of a page. In another example, the size of the frame may be adjusted based on the diagonal length of a page.

In an embodiment, a rule includes a parameter that specifies a size and/or position of a frame based on the lesser or greater relative size change between the original template and the new page. For example, a frame may be resized based on an encoded parameter in relation to a new page having twice the area as the original template.

In an embodiment, a rule includes a deletion parameter that specifies deletion of an element if the document is reduced in size. In this manner, nonessential content may be removed from the page to facilitate the display of other content that is of greater importance. In an embodiment, a rule includes a parameter that specifies addition of an element if the document is increased in size. In this manner, content may be added to the page to take advantage of larger page sizes.

In an embodiment, a rule includes a parameter that specifies a frame can be resized and repositioned to keep the alignment of the new frame relative to one or more edges of the original frame. In an embodiment, a rule includes an alignment to a fixed edge parameter. In this manner, a frame maintains alignment with a fixed edge of a page as the page size is adjusted. The frame alignment can be to a parallel and/or a perpendicular edge of the page. In an embodiment, a frame maintains a fixed, absolute distance from an edge of a page. This allows the computation of the new size and new position to be independent of each other. For example, a frame size can just be proportionally resized relative to the new page size, but the content of the frame might be resized based on the size of the larger dimension of growth. Therefore, the content would be larger than the frame. The content can then be positioned relative to that frame on any of the sizes or a combination, such as aligned to the top left, or horizontally center but bottom. This allows content to be resized in sophisticated ways but avoid collisions in the display of content and overall layout of design elements on the page.

FIG. 4 shows an exemplary published document 400 having a 10 inch by 2 inch page size according to the above rule. Document or page 400 may be published on an electronic display or as tangible media. In one embodiment document or page 400 is an advertisement. In some embodiments, document or page 400 is a printed flyer, a post card, a letter, a banner published on a webpage, or a wallpaper for a mobile phone. In the example shown in FIG. 4, document or page 400 includes four elements. Background element 410 is a graphic which fills the entire area of the page and lies behind each of the other elements. Headline element 420 includes a text portion at the top and a graphic (star pattern) on the bottom. Text element 430 includes large italicized text at the top and small text at the bottom. In some embodiments, text element 430 can include a plurality of fonts. In some embodiments, text element 430 can be variable data. Graphic element 440 (a top portion of a cellular phone) is shown toward the right side of document or page 400.

FIG. 5 shows a template 500 that was used to prepare published document or page 400. Template 500 includes four frames corresponding to the four elements of document or page 400. Background frame 510 is a frame that fills the entire area of the page. Headline frame 520 is positioned so that a portion of headline frame 520 is off the page because template 500 was designed for a 10 inch by 2 inch page size, and headline frame 510 includes a non-critical portion which does not need to be shown for this page size. When the document or page 400 is published in a larger page size, the entire portion of headline frame 510 may be shown. Text frame 530 is shown overlapping graphic frame 540. As with the headline frame 520, the relative positioning of text frame 530 and graphic frame 540 may change when the document or page 400 is published in a different page size.

Figure 6:
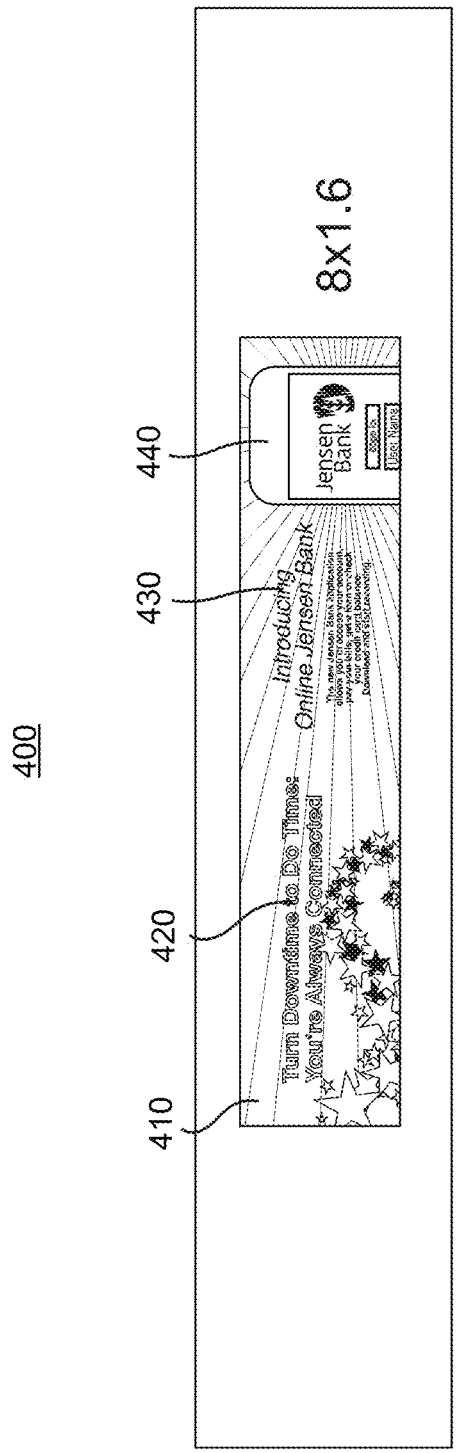
FIGS. 6-10 are examples of an advertisement automatically reformatted in new page sizes, according to embodiments of the present disclosure.

FIG. 6 shows an exemplary published document or page 400 having an 8 inch by 1.6 inch page size. Compared to FIG. 4, FIG. 6 shares the same page size aspect ratio of 1:0.2, but is smaller in length and width. Background element 410 maintains its alignment relative to the page and is shrunk to fit the smaller page size. Because each of frames 520, 530, and 540 are within the parameters specified by the user, each from is proportionately reduced in size on the page.

Figure 7:
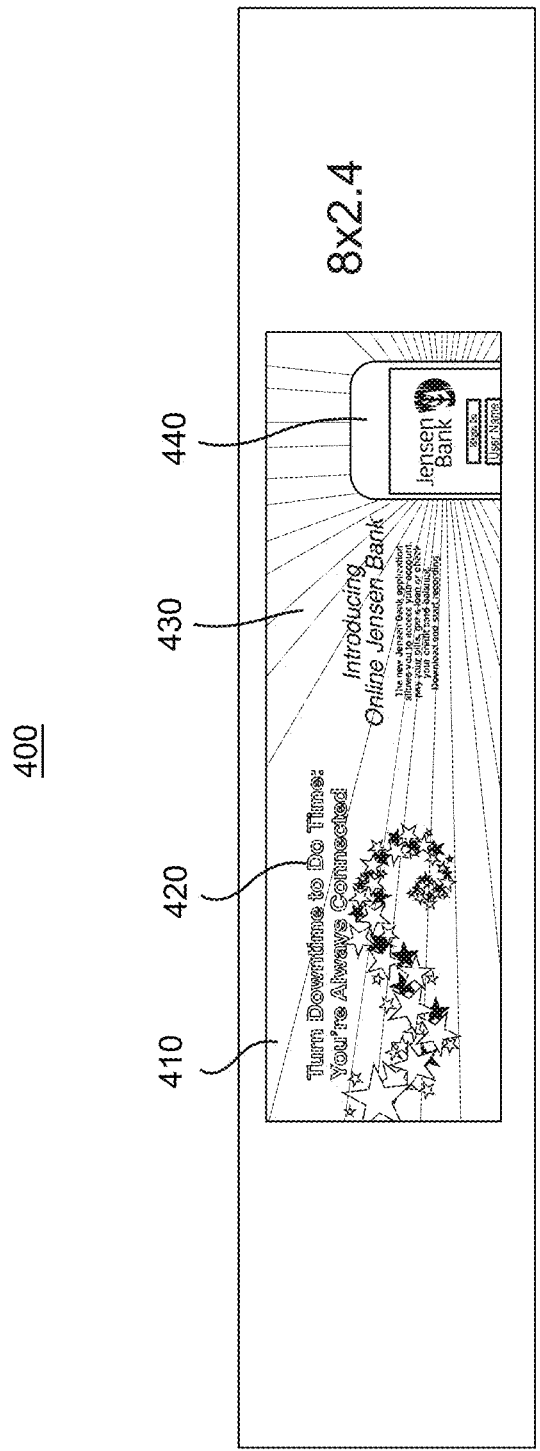

FIG. 7 shows an exemplary published document or page 400 having an 8 inch by 2.4 inch page size. In FIGS. 4 and 7, document or page 400 has an aspect ratio of 1:0.2, and in FIG. 7, document or page 400 has aspect ratio of 1:0.3. Background element 410 is stretched to fit the new page size. All portions of headline element 420 are shown in FIG. 7 including the lower portion of the graphic that was not visible in FIG. 4. The text element 430 remains unchanged between FIG. 6 and FIG. 7. A greater portion of graphic element 440 is shown in FIG. 7 than in FIG. 4 or 6. Graphic element 440 is aligned with the bottom of the page so a greater portion of background element 410 is shown above graphic element 440 in FIG. 7, than in FIG. 4 or 6.

Figure 8:
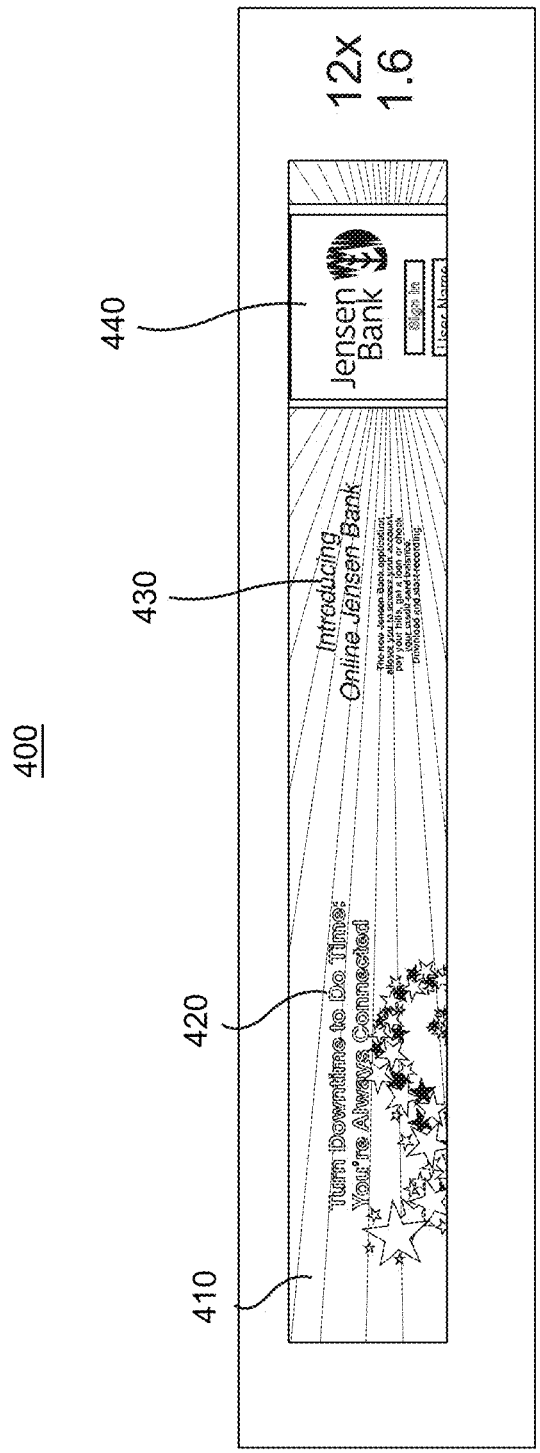

FIG. 8 shows an exemplary published document or page 400 having a 12 inch by 1.6 inch page size and a 1:0.13 aspect ratio. Compared to FIG. 4, background element 410 is stretched to accommodate the wider page size of FIG. 8. While the entire width of headline element 410 is shown in FIG. 8, a greater portion of the bottom graphic is now shown in FIG. 8 than in FIG. 4. Text element 430 is spaced farther away from graphic element 440 on the page in FIG. 8 than in FIG. 4, but remains vertically aligned within both figures. Graphic element 440 is enlarged to its full width but the top and bottom portions are not shown in FIG. 8.

Figure 9:
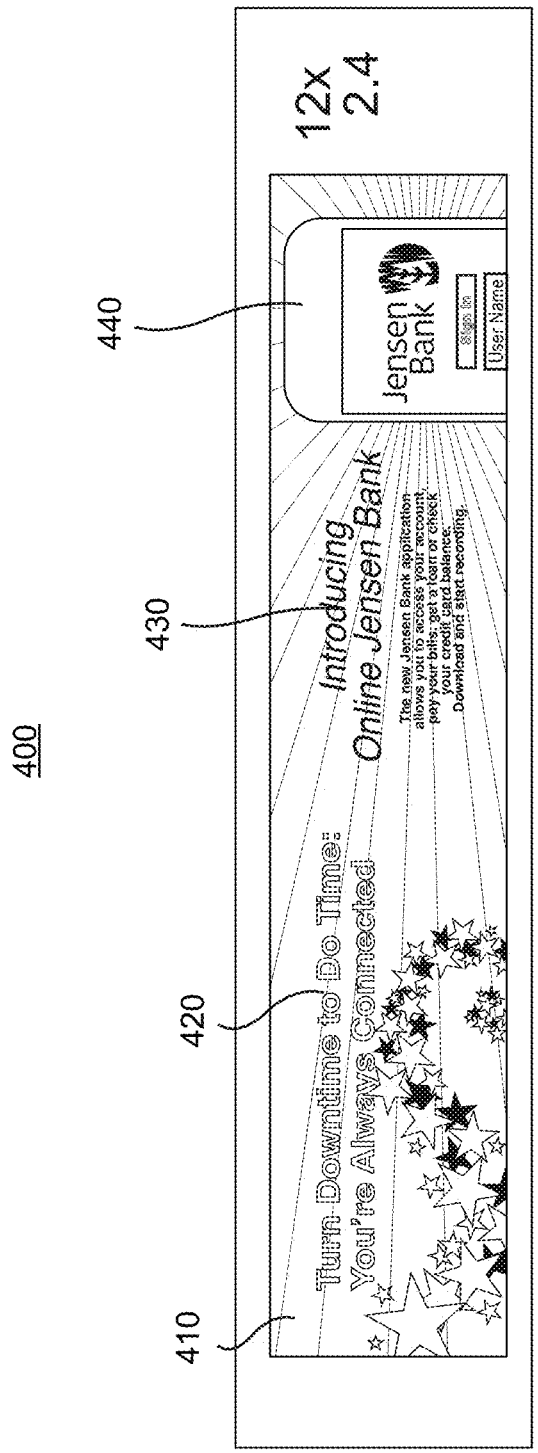
Figure 10:
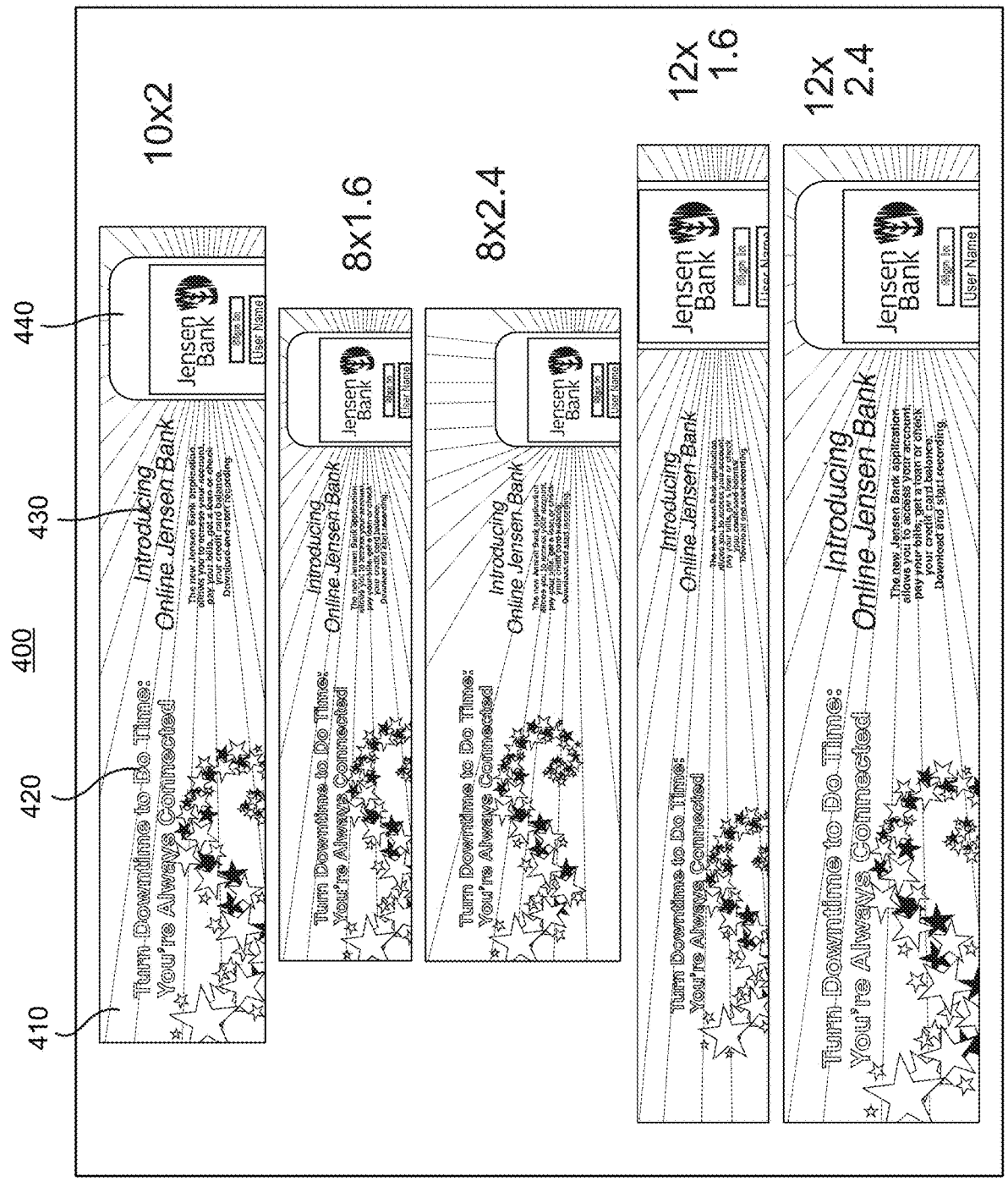

FIG. 9 shows an exemplary published document or page 400 having a 12 inch by 2.4 inch page size and a 1:0.2 aspect ratio. Compared to FIG. 4, background element 410 is stretched to fill the larger page size of FIG. 9. Headline element 420, text element 430, and graphic element 440 each have been proportionally enlarged or grown in FIG. 9, as compared to FIG. 4.

With respect to the embodiments herein, the digital printing system can be part of a larger system in which a new page size automatically reformatted and is previewed to a user who can then make further adjustments. The digital printing system can also be part of a completely automated system which accepts ad sizes and generates a number of ads sized appropriately with no further human intervention. For example, in variable data digital printing system, a list (of any length) of page sizes can be submitted to the system, and the system will automatically resize the pages and adjust the frames within those sized pages as appropriate. One exemplary implementation of this system is useful for newspaper advertisements, where many of the targeted newspapers or magazines have different sized ad space available. For a company that advertises in many newspapers, the prior art requires that they submit their ads in many sizes appropriate to the given target publications. This implementation allows the user to submit a list of ad sizes to the digital printing system, whereby the ads are automatically resized based on the rules that were previously created. This implementation solves the business need of creating many sizes of ads, without manually hand-crafting each one.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded into one or more different computers or other processors to implement various aspects of the present disclosure as discussed above.

The terms "program" or "software" or "code" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for automatically formatting a page having a first page size to a second page size, the system comprising:
  a composition subsystem, the composition subsystem configured for
    providing a template containing information relating to a layout of elements within the page wherein the elements include at least a first element including a first frame and a second element including a second frame and a third element including a third frame, the template having a template length and a template width wherein the first frame has a first length and a first width and wherein the first frame is positioned at a first position within the template corresponding to the first page size, encoding a first set of parameters of the first element and a second set of parameters of the second element and a third set of parameters of the third element wherein the first set of parameters includes at least a first parameter, the first set of parameters being associated with a first rule for at least one of automatically resizing and repositioning the first element within the template due to a change in page size between the first page size and the second page size and the second set of parameters being associated with a second rule for at least one of automatically resizing and repositioning the second element within the template due to the change in page size;

wherein the third set of parameters includes a content parameter specifying a size of the third frame based on content of the third frame wherein the size of the third frame is independent of the second page size;

receiving user input including a first set of values for the first set of parameters and a second set of parameter values for the second set of parameters;

setting the first set of parameters to the first set of values;

setting the second set of parameters to the second set of values wherein the first set of values is different from the second set of values;

repositioning, by executing a function including parameters set to the first set of values, the first frame within the template due to a relative change in page size between the first page size and the second page size;

repositioning, by executing the function with the parameters set to the second set of values, the second frame within the template due to the change in page size;

computing a difference between the second page size and the first page size, when the difference between the second page size and the first page size is within a default range, resizing a background frame, wherein the change in page size between the first page size and the second page size does not cause resizing of the third frame, when the difference between the second page size and the first page size is not within the default range reporting an error; and a printing subsystem, the printing subsystem configured for rendering an output, the output including the page having a page length and a page width corresponding to the second page size, at least one of the page length and the page width being different than the template length and template width.

2. The system of claim 1, wherein the first parameter and a second parameter of the second set of parameters are frame resizing parameters, the first set of values including a first value of the first parameter indicating the first frame is to be resized based upon the second page size and the second set of values including a second value of the second parameter indicating the second frame is to be resized independent of second page size.

3. The system of claim 2, wherein the first parameter is encoded in relation to the template length and template width.

4. The system of claim 1, wherein the first parameter is a disposable portion parameter of the first element which, when configured to a predefined value, causes at least a portion of the first element to not appear in the page if, after the resizing the first frame, the first frame does not fit in the second page size.

5. The system of claim 1, wherein the first parameter is an alignment parameter of the first element and wherein the alignment parameter is set to center such that a center of the first element is in a same relative position within the template when the first element is automatically resized due to a change in page size between the first page size and the second page size.

6. The system of claim 1, wherein the first parameter is a scaling ratio parameter of the first element and a second parameter of the second set of parameters is a scaling ratio parameter of the second element, the first set of values including a first value of the first parameter and the second set of values including a second value of the second parameter wherein the first value is different from the second value.

7. The system of claim 1, wherein the first parameter is a frame-to-element alignment parameter specified in relation to the second element, the first parameter specifying a manner in which a position of the first frame is automatically changed as the position of the second element is changed.

8. The system of claim 1, wherein the first parameter is a fixed edge parameter causing the first frame to maintain alignment with a fixed edge of the page as a size of the page is adjusted to the second page size.

9. The system of claim 1, wherein the template includes a rule specifying the addition of a fourth element to the elements when the second page size is greater than the first page size.

10. The system of claim 1, wherein the first parameter is specified in relation to a change of one dimension between the template and the page, the first parameter causing a size of the first frame to change based upon the change of the one dimension.

11. The system of claim 1, wherein the first parameter is specified in relation to a relative area size change between the template and the second page size and wherein a second parameter of the second set of parameters is specified in relation to a change of one dimension between the template and the page.

12. The system of claim 1, wherein the first parameter is a deletion parameter and wherein the deletion parameter specifies deletion of the first element from the page if the second page size is less than the first page size, the first element not being included in the output rendered by the printing subsystem.

13. The system of claim 1, wherein the composition subsystem is further configured for receiving the page length and the page width, the page length and the page width corresponding to the second page size; and generating a print file, the print file including the page formatted at the second page size.

14. The system of claim 13, wherein the print file includes one or more pre-rasterized objects and is in the form of a C, C#, C++, scripting languages, PPML, or an XML file.

15. The system of claim 14, further comprising:

a raster image processor, the raster image processor is configured for rasterizing the one or more pre-rasterized objects.

16. The system of claim 1, wherein rendering the output includes rendering the printed output on paper or other printable media using thermal toner or ink.

17. A non-transitory processor-readable medium containing processor executable instructions for automatically formatting a page of a first page size to a second page size, comprising:
provide a template containing information relating to a layout of elements within the page wherein the elements include at least a first element including a first frame and a second element including a second frame and a third element including a third frame, the template having a template length and a template width wherein the first frame has a first length and a first width and wherein the first frame is positioned at a first position within the template corresponding to the first page size;
encoding a first set of parameters of the first element and a second set of parameters of the second element and a third set of parameters of the third element wherein the first set of parameters includes at least a first parameter, the first set of parameters being associated with a first rule for at least one of automatically resizing and repositioning the first element within the template due to a change in page size between the first page size and the second page size and the second set of parameters being associated with a second rule for at least one of automatically resizing and repositioning the second element within the template due to the change in page size;
wherein the third set of parameters includes a content parameter specifying a size of the third frame based on content of the third frame wherein the size of the third frame is independent of the second page size;
receiving user input including a first set of values for the first set of parameters and a second set of parameter values for the second set of parameters;
setting the first set of parameters to the first set of values;
setting the second set of parameters to the second set of values wherein the first set of values is different from the second set of values;
repositioning, by executing a function including parameters set to the first set of values, the first frame within the template due to a relative change in page size between the first page size and the second page size;
repositioning, by executing the function with the parameters set to the second set of values, the second frame within the template due to the change in page size;
computing a difference between the second page size and the first page size
when the difference between the second page size and the first page size is within a default range, resizing a background frame wherein the change in page size between the first page size and the second page size does not cause resizing of the third frame
when the difference between the second page size and the first page size is not within the default range, reporting an error; and
generating a print file, the print file including the page having a page length and a page width corresponding to the second page size, at least one of the page length and the page width being different than the template length and template width.

18. The non-transitory processor-readable medium of claim 17, wherein the first parameter and a second parameter of the second set of parameters are frame resizing parameters, the first set of values including a first value of the first parameter indicating a first frame included in the first element is to be resized based upon the second page size and the second set of values including a second value of the second parameter indicating the second frame is to be resized independent of second page size.

19. The non-transitory processor-readable medium of claim 17, wherein the first parameter is encoded in relation to the template length and template width.

20. The non-transitory processor-readable medium of claim 17, wherein the first parameter is a disposable portion parameter of the first element which, when configured to a predefined value, causes at least a portion of the first element to not appear in the page if, after the resizing the first frame, the first element does not fit in the second page size.

21. The non-transitory processor-readable medium of claim 17, wherein the first parameter is an alignment parameter of the first element.

22. The non-transitory processor-readable medium of claim 17, wherein the first parameter is a scaling ratio parameter of the first element and a second parameter of the second set of parameters is a scaling ratio parameter of the second element, the first set of values including a first value of the first parameter and the second set of values including a second value of the second parameter wherein the first value is different from the second value.

23. The non-transitory processor-readable medium of claim 17, wherein the first parameter is a frame-to-alignment parameter specified in relation to the second element, the first parameter specifying a manner in which a position of a first frame included in the first element is automatically changed as the position of the second element is changed.

24. The non-transitory processor-readable medium of claim 17, wherein the first parameter is a fixed edge parameter causing a first frame included in the first element to maintain alignment with a fixed edge of the page as a size of the page is adjusted to the second page size.

25. The non-transitory processor-readable medium of claim 17, wherein the first parameter is specified in relation to a change of one dimension between the template and the page, the first parameter causing a size of a first frame included in the first element to change based upon the change of the one dimension.

26. The non-transitory processor-readable medium of claim 17, wherein the first parameter is specified in relation to a relative area size change between the template and the second page size.

27. The non-transitory processor-readable medium of claim 17, wherein the first parameter is a deletion parameter and wherein the deletion parameter specifies deletion of the first element from the page if the second page size is less than the first page size.

28. The non-transitory processor-readable medium of claim 17, wherein the first parameter is encoded in relation to template.

29. The non-transitory processor-readable medium of claim 17, wherein the first parameter is a scaling ratio parameter of the first element.

30. The non-transitory processor-readable medium of claim 17, wherein the first parameter is specified in relation to another element within the template.

31. The non-transitory processor-readable medium of claim 17, wherein the first parameter is a fixed edge parameter.

32. The non-transitory processor-readable medium of claim 17, wherein the first parameter is a content parameter.

33. The non-transitory processor-readable medium of claim 17, wherein the first parameter is specified in relation to a change of one dimension between the template and the page.

34. The non-transitory processor-readable medium of claim 17, further comprising instructions for generating the print file, the print file including the page formatted at the second size.

35. The non-transitory processor-readable medium of claim 34, wherein the print file includes one or more pre-rasterized objects and is in the form of a C, C#, C++, scripting languages, PPML, or an XML file.

36. The non-transitory processor-readable medium of claim 35, further comprising instructions f or:
rasterizing the one or more pre-rasterized objects using a raster image processor.

37. The non-transitory processor-readable medium of claim 17, the further comprising instructions for:
rendering a printed output based on the print file using a printing system.

38. The non-transitory processor-readable medium of claim 37, wherein rendering the printed output includes rendering the printed output on paper or other printable media using thermal toner or ink.

39. A non-transitory processor-readable medium containing processor executable instructions for automatically reformatting a page layout to a new page size, comprising:
preparing a first page having a first page size defined by a first length and a first width aid comprising a first layout including a first frame having a first position within the page layout and a second frame having a second position within the page layout;
receiving information specifying a disposable portion parameter of the first frame which, when configured to a predefined value, causes at least a portion of the first frame to not appear in the page if the first frame does not fit in a second page size resulting from the reformatting the page layout;
receiving information specifying an alignment parameter of the first frame wherein the alignment ratio parameter determines a manner in which a position of the first frame is automatically changed as a position of a second frame is changed when the page layout is reformatted to the second page size;
receiving information specifying a scaling ratio parameter of the first frame;
receiving user input including a first set of values for the disposable portion parameter, the alignment parameter and the scaling ratio parameter;
receiving a second length and a second width corresponding to the second page size;
receiving information specifying an addition parameter that specifies addition of an element if the second page size is greater than the first page size;
computing a difference between the second page size and the first page size;
reporting an error when the difference between the second page size and the first page size is not within a default range; and
reformatting the first layout to a second layout when the difference is within a default range wherein the reformatting includes resizing a background frame, the second layout being configured to fit the second page size, wherein the reformatting includes repositioning, by executing a function including parameters set to the first set of values, the first frame within the template due to a relative change in page size between the first page size and the second page size and wherein the repositioning causes the first frame to not fit within the second page size and at least a portion of the first frame to not appear within the page.

40. The non-transitory processor-readable medium of claim 39, further comprising instructions f or:
generating a print file containing the second layout.

41. The non-transitory processor-readable medium of claim 40, wherein the print file is in the form of a C, C#, C++, scripting languages, PPML, or XML file.

42. Then non-transitory processor-readable medium of claim 40, wherein the print file contains one or more pre-rasterized objects.

43. The non-transitory processor-readable medium of claim 42, further comprising instructions for:
rasterizing the one or more pre-rasterized objects using a raster image processor; and
rendering a printed output using a printer, the printed output comprising a document of the second page size displaying the second page layout.

44. A non-transitory processor-readable medium containing processor executable instructions for automatically reformatting a page layout to a new page size, comprising:
preparing a first page having a first page size defined by a first length and a first width aid comprising a first layout including a first frame having an X-axis position and a Y-axis position within the page layout and a second frame positioned within the page layout;
receiving information specifying a disposable portion parameter of the first frame;
receiving information specifying an alignment parameter of the first frame wherein the alignment parameter includes an X-axis alignment parameter and a Y-axis alignment parameter;
receiving information specifying a scaling ratio parameter of the first frame;
receiving a second length and a second width corresponding to a second page size;
computing a difference between the second page size and the first page size; and
reformatting the first layout to a second layout when the difference is within a default range wherein the reformatting includes resizing a background frame, the second layout being configured to fit the second page size, wherein the disposable portion parameter, when configured to a predefined value, causes the first frame to be reduced in size to the extent necessary for the first frame to fit within the second page size if resizing of the first frame based upon the alignment parameter and the scaling ratio parameter would cause at least a portion of the first frame to not fit within the second page size;
reporting an error when the difference is not within the default range; and
wherein the X-axis alignment parameter specifies, relative to the X-axis position of the first frame within the page layout, an aligned X-axis position of the first frame within the page layout when the page layout is reformatted to the new page size and wherein the Y-axis alignment parameter specifies, relative to the Y-axis position of the first frame within the page layout, an aligned Y-axis position of the first frame within the page layout when the page layout is reformatted to the new page size.

45. The non-transitory processor-readable medium of claim 44, further comprising instructions for:
generating a print file containing the second layout.

46. The non-transitory processor-readable medium of claim 45, wherein the print file is in the form of a C, C#, C++, scripting languages, PPML, or XML file.

47. Then non-transitory processor-readable medium of claim 45, wherein the print file contains one or more pre-rasterized objects.

48. A system for automatically reformatting a page layout to a new page size associated with a published document, the system comprising:
   a composition subsystem, the composition subsystem configured for
     preparing a first page having a first page size defined by a first length and a first width and comprising a first layout including a first element and a second element, the first element having a position within the page layout,
     receiving information specifying a disposable portion parameter of the first element which, when configured to a predefined value, causes at least a portion of the first element to not appear in a second page size resulting from the reformatting the page layout if the first frame does not fit in the second page size,
     receiving information specifying an alignment parameter of the first element, wherein the alignment parameter determines a manner in which a position of the first element is automatically changed as a position of the second element is changed when the page layout is reformatted to the second page size,
     receiving information specifying a scaling ratio parameter of the first element,
     receiving a second length and a second width corresponding to the second page size,
     computing whether or not a difference between the second page size and the first page size is within a default range,
     reporting an error when the difference between the second page size and the first page size is not within a default range, and
     reformatting the first layout to a second layout when the difference is within the default range wherein the reformatting includes resizing a background frame, the second layout being configured to fit the second page size, wherein the first element is adjusted based on one or more of the disposable portion parameter, the alignment parameter and the scaling ratio parameter and wherein the reformatting causes the portion of the first element to not appear within the second page size;
   a raster image processor; and
   a printing subsystem.

49. The system of claim 48, wherein the composition subsystem is configured for generating a print file containing the second layout.

50. The system of claim 49, wherein the print file is in the form of a C, C#, C++, scripting languages, PPML, or XML file.

51. The system of claim 49, wherein the print file contains one or more pre-rasterized objects.

52. The system of claim 51, wherein the raster image processor is configured for rasterizing the one or more pre-rasterized objects; and
   wherein the printing subsystem is configured for rendering a printed output, the printed output comprising a document of the second page size displaying the second page layout.

53. The non-transitory processor-readable medium of claim 44, further comprising instructions for:
   receiving information specifying a deletion parameter of the first element, the deletion parameter specifying deletion of the first element from the page layout if the second page size is less than the first page size.

\* \* \* \* \*